June 27, 1939.  C. STACEY  2,163,988

SAFETY APPARATUS FOR MOTOR VEHICLES

Filed Oct. 21, 1937   2 Sheets-Sheet 1

Inventor
Cromwell Stacey,
By J. Stanley Burch
Attorney

June 27, 1939.   C. STACEY   2,163,988
SAFETY APPARATUS FOR MOTOR VEHICLES
Filed Oct. 21, 1937    2 Sheets-Sheet 2
Fig. 3.
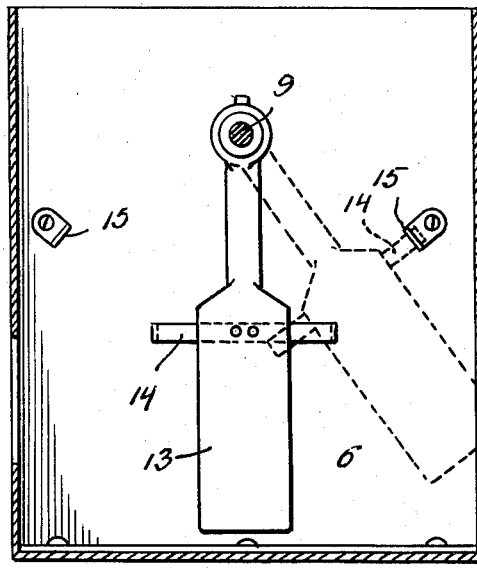
Fig. 4.
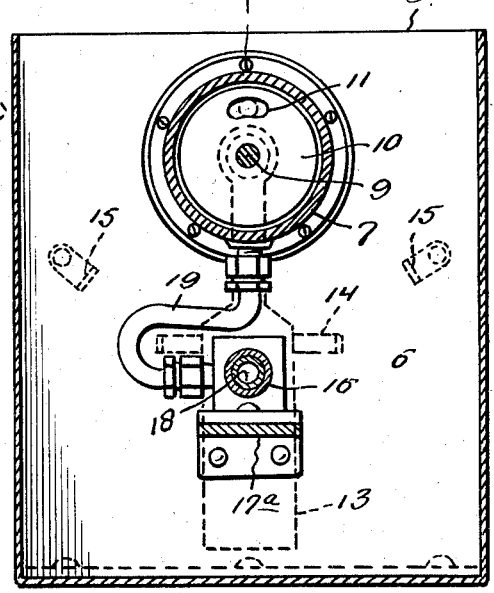
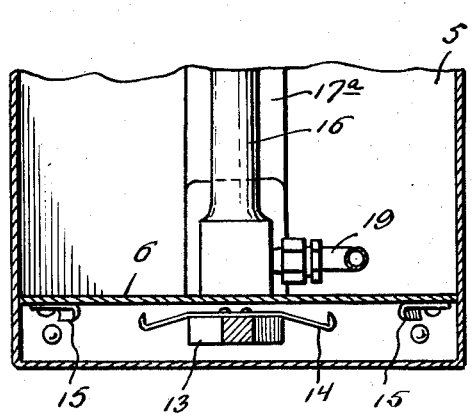
Fig. 5.
Inventor
Cromwell Stacey,
By Stanley Birch
Attorney Patented June 27, 1939

2,163,988

UNITED STATES PATENT OFFICE 2,163,988

SAFETY APPARATUS FOR MOTOR VEHICLES

Cromwell Stacey, Port Angeles, Wash.

Application October 21, 1937, Serial No. 170,265

3 Claims. (Cl. 137—139)

My invention relates to improvements in safety apparatus for the prevention of fire due to collision or overturning of a motor vehicle.

More particularly, the present apparatus is of the type in which a weight or inert mass is adapted to function for cutting off the fuel supply of a motor vehicle when the latter is involved in a collision or overturns.

An object of the present invention is to provide an improved apparatus of the above character which is simple and compact in construction, efficient in operation, and otherwise well adapted to meet with the requirements for successful commercial use.

The present invention consists in the novel construction and arrangement of parts hereinafter more fully described, shown in the accompanying drawings and claimed.

In the drawings:

Figure 3 is a vertical transverse section on line 3—3 of Figure 1.

Figure 4 is a vertical transverse section on line 4—4 of Figure 1; and

Figure 5 is a fragmentary horizontal section on line 5—5 of Figure 1.

Figure 1:
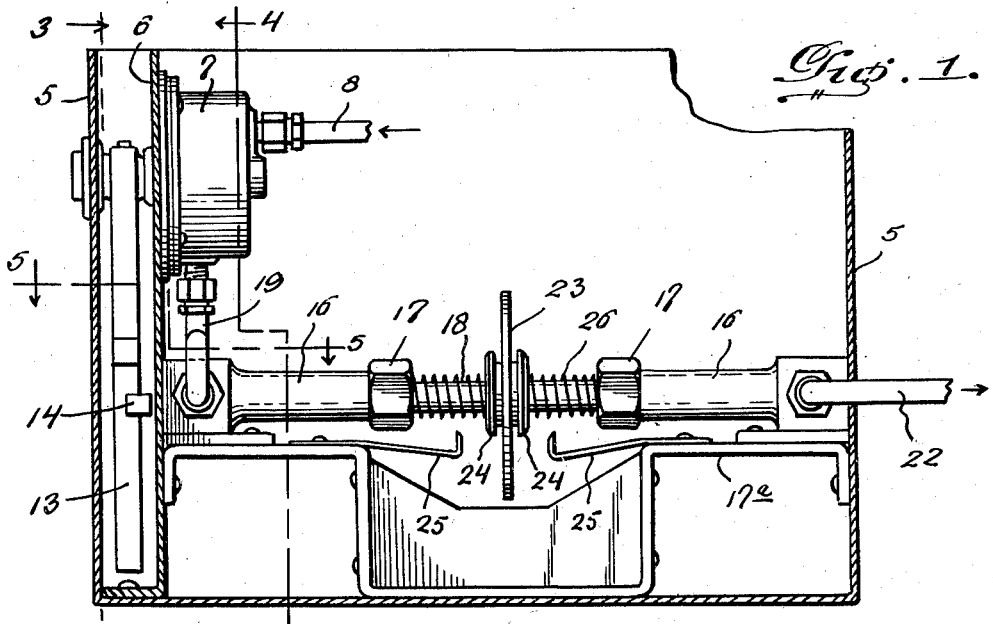
Figure 1 is a view, partly in vertical longitudinal section and partly in side elevation, of a safety apparatus constructed in accordance with the present invention.

The apparatus shown comprises a frame or casing 5, preferably in the form of a rectangular receptacle, adapted to be secured to the vehicle in any suitable or convenient manner and by any suitable means. Adjacent but spaced from the forward wall of casing 5 is a vertical support or partition 6 to the upper portion of which is secured a circular chamber 7 provided in the upper portion of its rear wall with a fuel inlet receiving the adjacent end of a fuel supply pipe 8 leading from the main fuel tank of the automobile. Journaled in the chamber 7, support or partition 6 and the front wall of casing 5 is a horizontal shaft 9 disposed to extend longitudinally of the vehicle, and secured upon the rear end portion of shaft 9 within chamber 7 is a disk 10 having an arcuate slot 11 in the upper portion thereof arranged to normally register with the fuel inlet of chamber 7 so as to permit fuel to freely flow from pipe 8 into chamber 7. Surrounding shaft 9 within chamber 7 between the forward wall of the latter and disk 10 is a helical compression spring 12 which urges the disk 10 into intimate contact with the rear wall of chamber 7 so that material leakage of fuel between disk 10 and the rear wall of chamber 7 will be prevented. Attached to and depending from the forward end portion of shaft 9 between support or partition 6 and the front wall of casing 5 is a pendulum 13. The arrangement is such that lateral tilting of the vehicle will cause lateral swinging of pendulum 13 and lateral swinging of pendulum 13 will cause corresponding turning of shaft 9 and disk 10. However, due to the arcuate elongated form of slot 11, limited lateral swinging of pendulum 13 and turning of shaft 9 and disk 10 will be permitted without causing the disk 10 to close the fuel inlet opening of chamber 7. Swinging of pendulum 13 beyond such predetermined limit, however, will cause the disk 10 to turn sufficiently for bringing the slot 11 out of registry with the fuel inlet opening of chamber 7 so as to cut off the supply of fuel from pipe 8 to chamber 7. When a vehicle tilts laterally to this predetermined extent, the vehicle will or is likely to overturn and it is desirable to cut off the fuel supply at this time for the prevention of fire. Naturally, the fuel supply must be maintained cut off under such conditions, and for such purpose, catch means is provided for releasably holding the pendulum 13 when it swings to this abnormal degree laterally in either direction, such catch means consisting of a double ended catch member 14 secured to pendulum 13 and having operative ends projecting to opposite sides of said pendulum for respective engagement with keeper lugs 15 mounted in proper position upon the forward side of support or partition 6 at opposite sides of pendulum 13 as shown clearly in Figures 3 and 5. Thus, when the vehicle equipped with the present apparatus tilts laterally to such an abnormal extent that the vehicle is likely to overturn, the casing 5 and parts carried thereby will correspondingly tilt relative to pendulum 13 so that the catch member 14 engages the keeper lug 15 at that side toward which the vehicle tilts, thereby maintaining the pendulum 13 in such position relative to casing 5 as to retain the disk 10 in the position which it has moved relative to chamber 7 for cutting off the supply of fuel from pipe 8 to chamber 7. While the pendulum is indicated as swung by dotted lines in Figure 3, the actual operation which takes place in the overturning of a vehicle is tilting of casing 5 while pendulum 13 remains vertical, the keeper lug 15 at the side toward which the vehicle is overturning moving toward and engaging the catch member 14. Consequently, the chamber 7 turns relative to disk 10 while the latter is held against turning through its connection with pendulum 13, the fuel inlet opening of chamber 7 ultimately moving out of register with slot 11. Should the vehicle be collided with at one side or the other, however, the pendulum 13 may be caused to swing due to the sudden impact, even though the automobile and casing 5 remain in normal upright condition. In either case, however, the necessary relative turning movement between disk 10 and chamber 7 occurs to cut off the fuel supply between pipe 8 and chamber 7.

Figure 2:
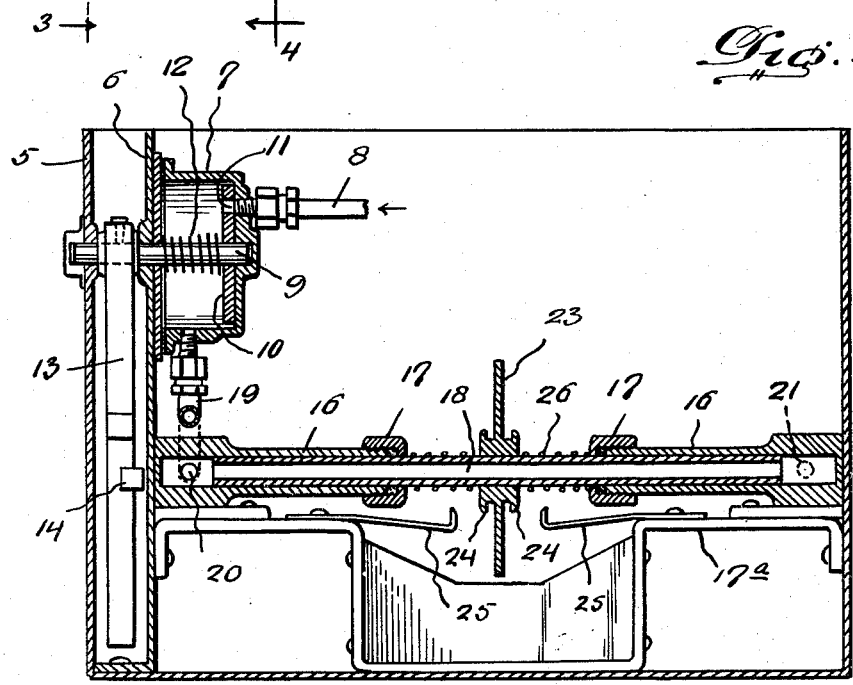
Figure 2 is a view similar to Figure 1 with other parts in vertical longitudinal section, the plane of section being indicated by the line 2—2 in Figure 4.

Mounted in the casing 5 are spaced longitudinally alined tubular fittings 16 carried by the end of a suitably reinforced longitudinally arranged bracket 17a. The adjacent or inner ends of the tubular fittings 16 are provided with stuffing boxes 17, and slidably extending through the stuffing boxes 17 into the fittings 16 are the ends of a sliding tube 18. The chamber 7 has a bottom fuel outlet connected by a pipe 19 with a lateral fuel inlet provided at 20 in the forward end portion of the forward one of the tubular fittings 16. The rearward one of the tubular fittings 16 is provided with a lateral fuel outlet as indicated at 21 connected by a pipe 22 with the carburetor of the vehicle engine, not shown. The arrangement is such that forward sliding movement to a predetermined extent of tube 18 will cause the latter to cut off the fuel supply from chamber 7 by way of pipe 19 through inlet 20, while rearward sliding movement of tube 18 to a predetermined extent will cause tube 18 to cut off the passage of fuel from the rear fitting 16 to pipe 22 leading to the carburetor. Secured on the intermediate portion of tube 18 between the fittings 16 is a weight 23 preferably in the form of a disk having an enlarged hub projecting forwardly and rearwardly and provided on each end with an outwardly projecting lug or rib 24. Also, mounted upon the bracket 17a below the tube 18 are catch members 25 arranged to respectively engage the adjacent lug or rib 24 of weight 23 for releasably holding the tube 18 when shifted to a predetermined extent forwardly or rearwardly as discussed above. Tube 18 is normally yieldingly maintained in an intermediate position as shown in Figure 2 by means of coil compression springs 26 encircling tube 18 between the opposite sides of weight 23 and the adjacent ends of fittings 16. Thus, when the vehicle equipped with the present apparatus is in collision the weight 23 will cause shifting of tube 18 so as to cut off the fuel supply. If the vehicle is collided with at the front, the tube 18 and weight 23 will shift forwardly so that tube 18 cuts off the supply of fuel at the inlet 20 in the forward fitting 16. On the other hand, if the vehicle equipped with this apparatus is collided with at the rear by another vehicle, the weight 23 and tube 18 will shift rearwardly so as to cut off the fuel supply at the outlet 21 of the rear fitting 16. In either case, the tube 18 is releasably retained in its abnormally slid position by means of one of the catches 25 engaging the cooperating rib or lug 24 of weight 23. When the tube 18 is slid rearwardly the rearward catch 25 will of course function, while the forward catch 25 will function when tube 18 and weight 23 are shifted forwardly under the impact of a collision. Naturally, the pendulum 13 or tube 18 will be permitted to return to normal position by manual release of the catch member 14 or the proper catch member 25, respectively.

From the foregoing description, it will be seen that I have provided a simple and efficient apparatus adapted to be readily installed in the main fuel supply line of a motor vehicle for cutting off the fuel supply to the engine carburetor of the vehicle in case the latter is in collision and/or in case the vehicle overturns because of a crash or other accident. The operation and construction will be readily apparent from the foregoing description by those skilled in the art, and the simplicity and efficiency of the apparatus will be readily apparent. It will of course be understood that the invention is susceptible of minor modifications and changes in details of construction without departing from the spirit and scope of the invention as claimed.

What I claim as new is:

1. A safety apparatus for use on motor vehicles comprising spaced alined tubular fittings respectively provided with fuel inlet and outlet ports, a tubular valve member for normally conducting fuel from one fitting to the other, yieldable means normally positioning said tube wherein flow of fuel is freely permitted through said fittings and said tube, and an inert mass carried by said tube operable upon collision for sliding said tubular valve member against the action of said yieldable means to shut off the flow of fuel into one of said fittings when the vehicle is collided at one end and to cut off the flow of fuel from the other fitting when the vehicle is collided with at the other end.

2. A safety apparatus for use on motor vehicles comprising spaced alined tubular fittings respectively provided with fuel inlet and outlet ports, a tubular valve member for normally conducting fuel from one fitting to the other, yieldable means normally positioning said tube wherein flow of fuel is freely permitted through said fittings and said tube, an inert mass carried by said tube operable upon collision for sliding said tubular valve member against the action of said yieldable means to shut off the flow of fuel into one of said fittings when the vehicle is collided at one end and to cut off the flow of fuel from the other fitting when the vehicle is collided with at the other end, and releasable means to automatically retain the tube in cutting off position when shifted by collision in either direction.

3. A safety apparatus for use on motor vehicles comprising spaced alined tubular fittings respectively provided with fuel inlet and outlet ports, a tubular valve member for normally conducting fuel from one fitting to the other, yieldable means normally positioning said tube wherein flow of fuel is freely permitted through said fittings and said tube, an inert mass carried by said tube operable upon collision for sliding said tubular valve member against the action of said yieldable means to shut off the flow of fuel into one of said fittings when the vehicle is collided with at one end and to cut off the flow of fuel from the other fitting when the vehicle is collided with at the other end, and releasable means to automatically retain the tube in cutting off position when shifted by collision in either direction, said inert mass comprising a weight in the form of a disk having an enlarged hub provided on opposite ends with projecting ribs, said releasable means comprising catch members arranged to engage the respective ones of said ribs when the tube is slid toward the same.

CROMWELL STACEY.